M. LANGHAUS.
DRINK MIXER.
APPLICATION FILED FEB. 7, 1921.

1,392,875.

Patented Oct. 4, 1921.

Morris Langhaus,
INVENTOR

BY Victor J. Evans
ATTORNEY

WITNESS: J.W. Ely

M. LANGHAUS.
DRINK MIXER.
APPLICATION FILED FEB. 7, 1921.

1,392,875.

Patented Oct. 4, 1921.
2 SHEETS—SHEET 2.

Morris Langhaus.
INVENTOR

BY Victor J. Evans
ATTORNEY

WITNESS:

UNITED STATES PATENT OFFICE.

MORRIS LANGHAUS, OF NEW YORK, N. Y.

DRINK-MIXER.

1,392,875.

Specification of Letters Patent.

Patented Oct. 4, 1921.

Application filed February 7, 1921. Serial No. 443,117.

*To all whom it may concern:*

Be it known that I, MORRIS LANGHAUS, a citizen of the United States, residing at New York city, in the county of New York and State of New York, have invented new and useful Improvements in Drink-Mixers, of which the following is a specification.

This invention relates to improvements in drink mixers and one of the principal objects is to provide a device for simultaneously mixing a number of glasses of malted milk, egg shakes, or similar drinks.

Another object is to construct a device of this nature which shall be of light construction, consisting of few simple parts, comparatively cheap to manufacture, and highly efficient for the purpose for which it is constructed.

Another object is to provide novel and efficient means for moving the various stirring or agitating devices into and out of mesh with a general operator.

With these and other objects in view which will be more apparent as the specification proceeds, the invention resides in certain novel features of construction and combination and arrangement of parts, the essential features of which are hereinafter fully described, are particularly pointed out in the appended claims and are shown in the accompanying drawing, in which:—

Like characters of reference refer to like parts in all views.

Figure 1:
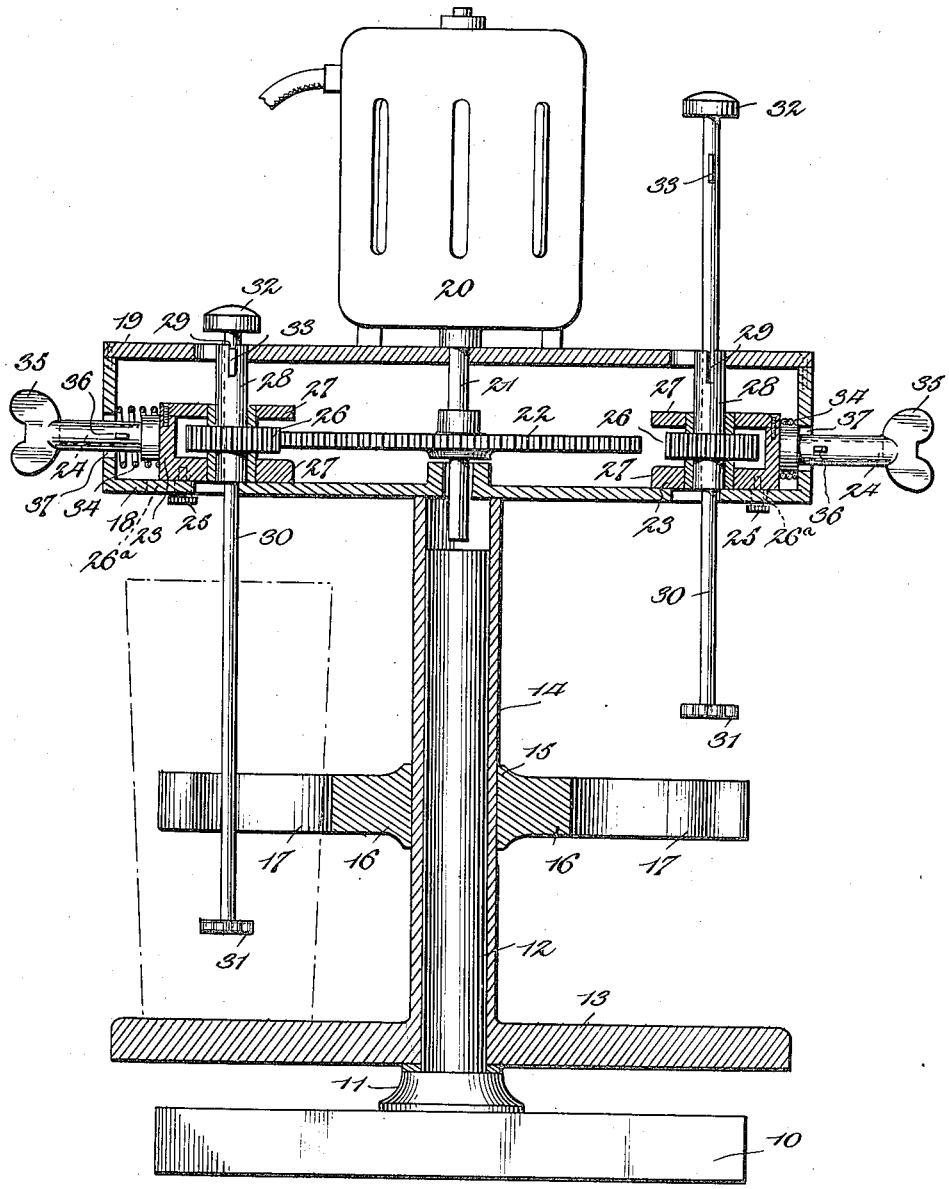
Figure 1 is a vertical sectional view of my improved drink mixer.
Figure 2:
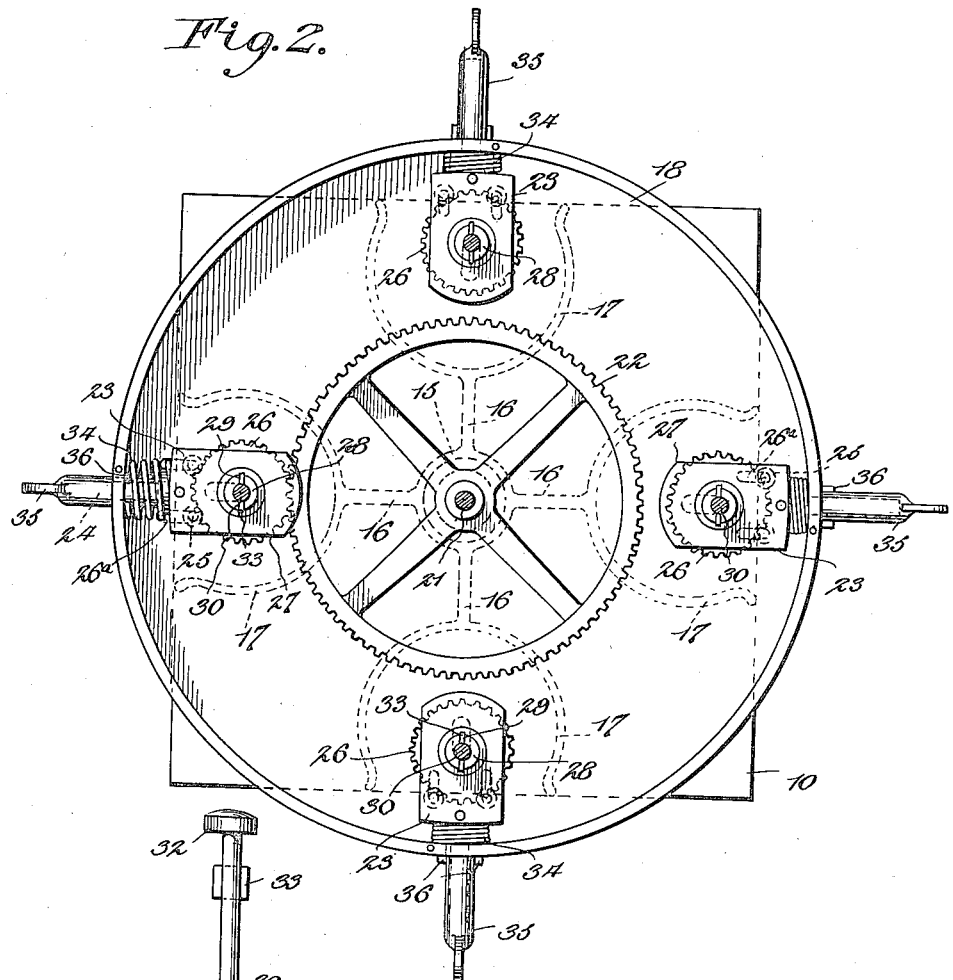
Fig. 2 is a horizontal sectional view taken just below the cover plate.
Figure 3:
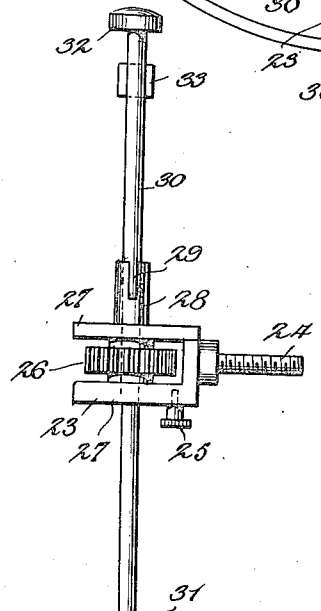
Fig. 3 is a detail elevation of one of the stirring devices.

Referring to the drawing in detail, 10 represents the base of the machine which may be of any suitable size and shape and which is preferably cast from some heavy material and has formed in the center of its upper surface an upstanding boss or pedestal 11 from which rises the supporting shaft 12.

Rotatably mounted on the shaft 12 is a glass stand 13 having a tubular sleeve 14 surrounding said shaft 12 and extending upwardly above the top of shaft 12. The stand 13 and sleeve 14 may be formed integrally or may be secured together in any suitable manner. Secured to the sleeve 14 is a member 15 having radiating arms 16 the ends of which are bifurcated as at 17 to grasp a glass and maintain the same in proper position for the mixing of its contents.

Secured at the top of sleeve 14 so as to be rigid therewith is a box 18 having a cover 19 secured in place by screws or any other desirable means. This box contains the transmission mechanism operated by the motor to rotate the agitators.

An electric motor 20 is secured to the cover 19 and is of any usual well-known type, its shaft being designated at 21. Shaft 21 projects downwardly through the gear box 18 and may be provided with suitable bearings in the top and bottom of the box. Secured to the shaft 21 is a master gear wheel 22 which is adapted to drive the stirring or agitating devices now to be described.

A plurality of stirring devices are movably mounted in the box 18, and while four are shown there may be more if desired. The mechanism for each stirring device is the same so that only one will be described. Slidably mounted on the bottom of box 18 is a member 23 having a shank 24 extending through the side of the box, and directed in its sliding movements by a screw 25 extending through a slot 26ª in the bottom of the box 18, said screw being secured in member 23 and having a head below the box 18 to prevent upward movement of the member 23. A gear pinion 26 is mounted between the fingers 27 of the member 23 and is provided with an upstanding collar 28 which is secured to pinion 26 in any well known and desirable manner and which is provided with vertical slots 29 for a purpose about to be described. A stirring rod 30 passes freely through collar 28 and gear 26 and carries at its lower end an agitator body 31 and at its upper end a suitable manipulative knob or finger piece 32. A key 33 passes through rod 30 above collar 28 and projects on each side of the rod 30 so that it may be lowered into engagement with slots 29 thereby locking the rod to the gear 26 for rotation therewith.

A spring 34 tends constantly to move the member 23 inwardly so as to effect engagement of gear 26 with the master gear 22. A thumb piece or handle 35 is rotatably secured on the shank 24 and is provided with lugs 36 which normally engage the side of box 18 to hold member 23 against the action of spring 34. By turning member 35 the lugs 36 may be brought into register with apertures 37 in the side of the box through which they may pass to permit engagement of the gears 26 and 22.

In operation the operator places a glass containing the required ingredients on the board 13 and in one of the holders 17. He then lowers the rod 30 until element 31 is in the liquid and key 33 is in slots 29. The handle 35 is then turned until lugs 36 register with apertures 37, whereupon, spring 34 throws gear 26 into mesh with gear 22. If the motor is not already running, it is then started, causing rotation of gears 22 and 26, collar 28, shaft 30 and agitator 31.

It will be seen that by the arrangement described, several drinks may be mixed concomitantly. This saves the space necessary for a battery of single machines of the type at present used and also saves the expense of a plurality of motors. It will also be observed that by securing the glass support, glass holders and gear box together, the device may be rotated to bring different glass holders into easy reach without disarranging the registry of glass holders and agitators.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a base, a glass stand rotatably mounted thereon, a glass holder secured to for rotation with said stand, and a plurality of agitating devices mounted for movement with said stand and holder.

2. In a device of the class described, the combination of a base, a case rotatably mounted on said base, a motor secured on said case, a master gear mounted in said case for operation by said motor, a plurality of agitators, and a gear for each of said agitators and movable selectively into and out of engagement with said master gear.

3. In a drink mixer, the combination with a rotatable gear box, a motor mounted thereon, a master gear operable by said motor, pinions mounted for reciprocation in said gear box into and out of engagement with said master gear, and means whereby said pinions may be locked in either position.

4. In a drink mixer, the combination with a rotatable gear box, a motor mounted thereon, a master gear operable by said motor, a U-shaped support for each of said pinions, and an operating finger-piece secured to each of said supports.

5. In a device of the class described, the combination of a motor, drink mixing devices operable by said motor, supporting means for said motor and devices, a glass table, a glass holder, and a standard upon which all of the aforesaid elements are pivotally mounted.

6. In a device of the class described, the combination of a master gear, a plurality of pinions, means for selectively locking said pinions either into or out of mesh with said master gear, and agitators individual to said pinions.

In testimony whereof I have affixed my signature.

MORRIS LANGHAUS.